(12) United States Patent
Kotlarski

(10) Patent No.: US 6,779,661 B1
(45) Date of Patent: Aug. 24, 2004

(54) PACKING UNIT FOR A VEHICLE WINDSCREEN WIPER BLADE WHICH IS AT LEAST PARTLY LOCATED THEREIN

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/869,416

(22) PCT Filed: Sep. 28, 2000

(86) PCT No.: PCT/DE00/03388

§ 371 (c)(1),
(2), (4) Date: Jun. 27, 2001

(87) PCT Pub. No.: WO01/30619

PCT Pub. Date: May 3, 2001

(30) Foreign Application Priority Data

Oct. 28, 1999 (DE) .......................... 199 51 971

(51) Int. Cl.[7] .............................. A45C 11/26
(52) U.S. Cl. ...................... 206/349; 206/335; 206/471
(58) Field of Search ............... 206/349, 335, 206/525, 461, 462, 471, 769, 770, 775, 778, 779, 776; D09/415, 416

(56) References Cited

U.S. PATENT DOCUMENTS

| | | | |
|---|---|---|---|
| 2,026,626 A | | 1/1936 | Gilfillan |
| 3,885,265 A | * | 5/1975 | Deibel et al. .......... 15/250.452 |
| 4,177,538 A | * | 12/1979 | Blaiklock et al. ........ 15/250.39 |
| 4,239,104 A | | 12/1980 | Roccaforte et al. |
| 4,854,450 A | * | 8/1989 | Fisher ........................ 206/469 |
| 5,379,896 A | * | 1/1995 | Snow et al. ................ 206/470 |
| D357,626 S | * | 4/1995 | Snow et al. ................ D9/415 |

FOREIGN PATENT DOCUMENTS

| | | | |
|---|---|---|---|
| DE | 1 505 397 | 10/1969 | |
| DE | 23 26 093 A | 12/1974 | |
| DE | 196 412 042 A1 | 4/1998 | |
| DE | 197 29 864 A1 | 1/1999 | |
| GB | 2190066 A | * 11/1987 | ........... B65D/75/36 |

* cited by examiner

Primary Examiner—Jila M. Mohandesi
(74) Attorney, Agent, or Firm—Michael J. Striker

(57) ABSTRACT

A packaging unit for a vehicle windscreen wiper blade (10), which is at least partly located therein is disclosed. Said wiper blade comprises a long, elastic, rubber wiper strip with a wiper lip (14), which may be applied to the windscreen (20). Said wiper strip is mounted on a strip-like, sprung support element (16), with the longitudinal axes held parallel, whereby the support element (16), which has curved faces when unstressed, is arranged on the outer side, in relation to the correspondingly curved wiper lip (14). A useful, space-saving packaging for the wiper blade is achieved, whereby the wiper blade (10) has longitudinal supports arranged along both sides of a plane of symmetry (402) and said supports are perpendicular to this plane. Furthermore, the packaging unit is an oblong, longitudinally stiff component, with a channel-shaped cross-section, which crosses the plane of symmetry of the wiper strip along the whole length thereof, with the bottom of the packaging channel maintaining a separation from the wiper lip and, in the region of the longitudinal edges thereof, said packaging has supports for the supporting surfaces of the wiper blade, which hold the wiper blade in an essentially straight position against the tension of the support element (16).

11 Claims, 3 Drawing Sheets

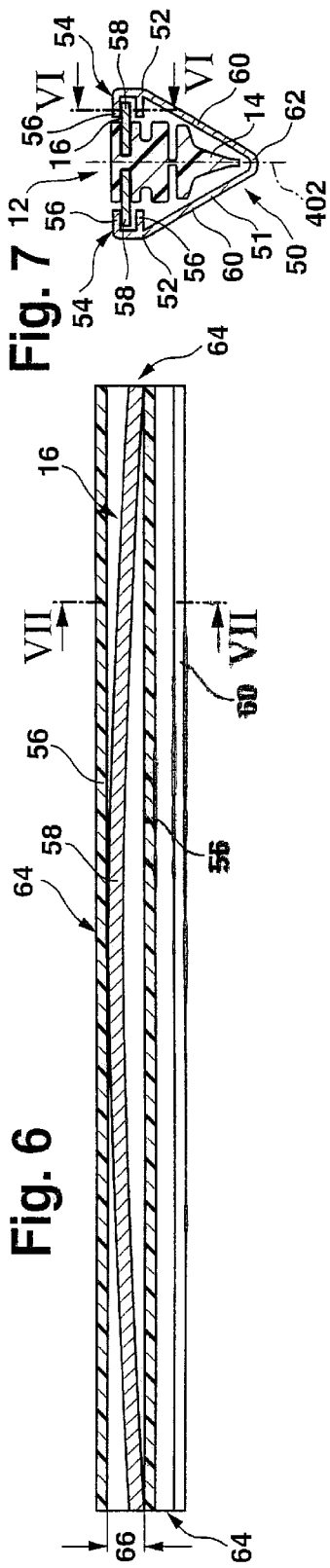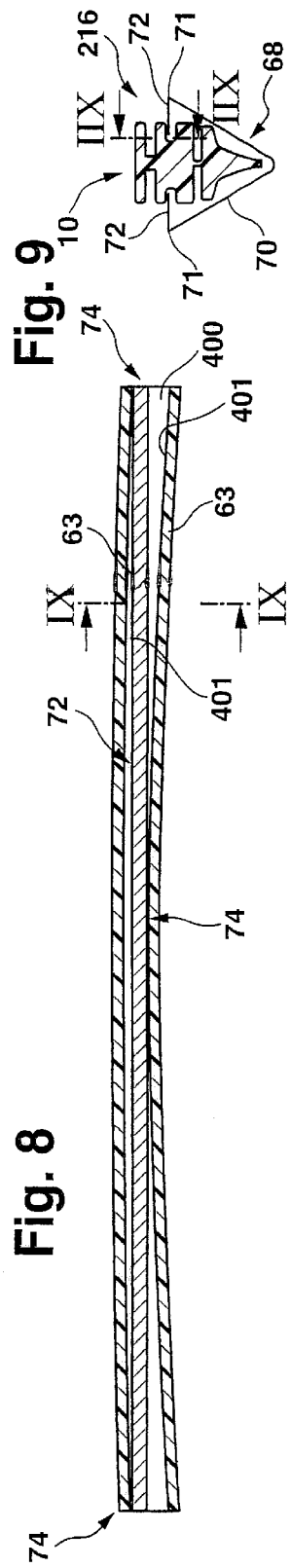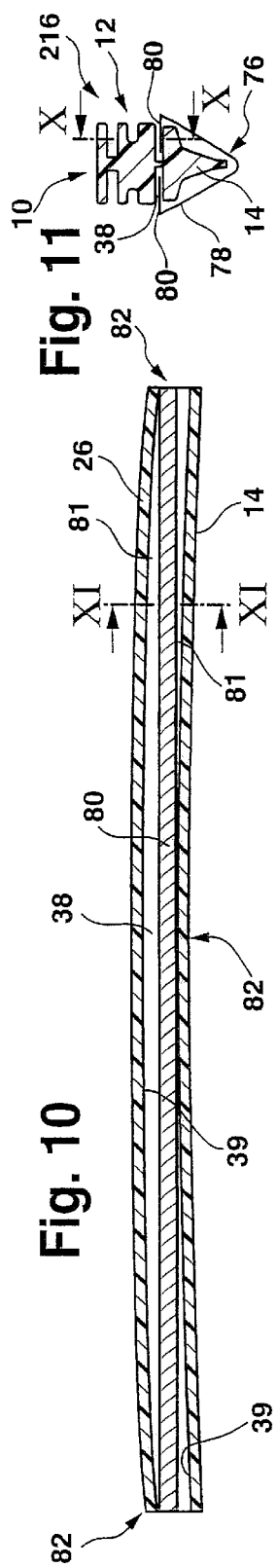

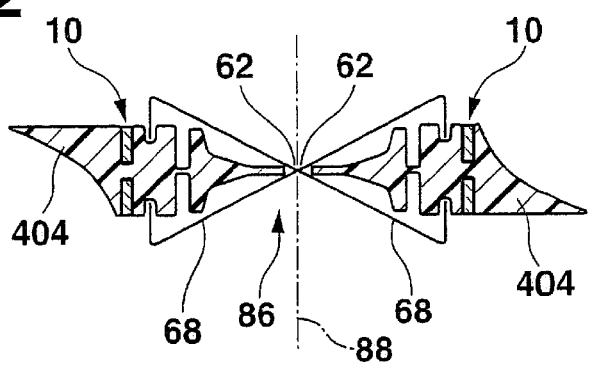
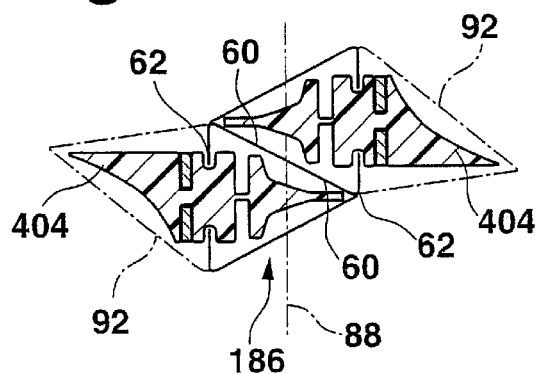
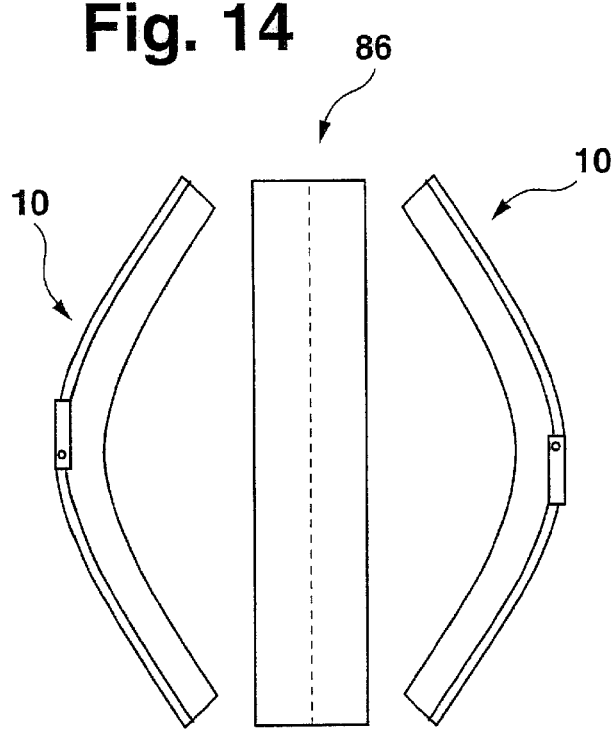
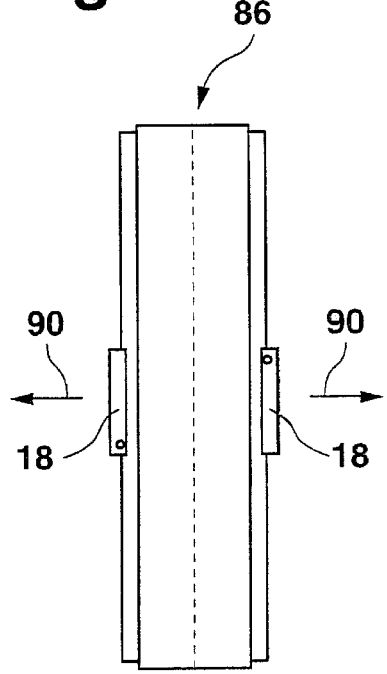

PACKING UNIT FOR A VEHICLE WINDSCREEN WIPER BLADE WHICH IS AT LEAST PARTLY LOCATED THEREIN

BACKGROUND OF THE INVENTION

The wiper blades that reach the spare parts market must be packaged, for various reasons. Primarily this is to protect the vulnerable wiper edges, located on the wiper lips of the rubber-elastic wiper blade strips, which have to perform the precision work in wiping motor vehicle windows. Conventional wiper blades in which the wiper blade strip is retained by a support bracket frame (German patent disclosure DE 15 05 397) are accommodated loosely in packing units known as blister packs. Because the straightened-out wiper blade is wrapped loosely and thus without tension, satisfactory protection as well as good sales presentation of such wiper blade are achieved. In addition, the size of a packing unit can also be adapted to the size of the wiper blade such that the space required for the packing unit can be kept as small as possible.

Wiper blades with an elongated spring-elastic support element for the wiper strip (German patent disclosures DE 196 41 042 A1 and DE 197 29 864 A1) must be curved in the unstressed state—that is, the way in which they reach the market—in such a way that during wiper operation, proper contact of the wiper lip over the entire length of the wiper blade is assured, even for spherically curved motor vehicles. This precurvature of the wiper blade means that it takes up considerable space, if it is to be accommodated loosely in a known packing unit. Straightening out the wiper blade in a narrow packing unit would mean that because the support element is now stressed, the wiper lip would be constantly pressed with its wiping edges against an inner wall of the packing unit. This would lead to deformation of the wiper lip and thus make the wiper blade unusable.

SUMMARY OF THE INVENTION

The straightened-out, channel-like packing unit surrounds the wiper lip with spacing over the entire length of the wiper lip. The bracing means disposed on the longitudinal channel edges rest on the supports of the wiper blade in such a way that the wiper blade on being introduced into the packing unit is straightened from its unstressed, curved shape in a space-saving way to match the straightening out of the packing unit and is fixed in this straightened-out position by its own rigidity, without thereby putting stress on the wiper lip. The disposition of the wiper blade supports on both sides of the longitudinal plane of symmetry—which is oriented transversely to the band faces of the support element—prevents the packaged wiper blade from becoming curved in the direction of the support element band faces. Straightening out the wiper blade has no adverse effects on its later use, because this straightening out is no greater than the straightening out during wiper operation that is dictated by the shape of the window to be wiped.

In certain applications, in a first embodiment of the invention it can be advantageous if the support element protrudes in a least some portions past the wiper strip with at least two lateral peripheral portions disposed opposite one another relative to the plane—which in most cases is a plane of symmetry—on which peripheral portions the supports of the wiper blade are embodied, and if furthermore extensions of U-shaped cross section associated with the supports of the wiper blade are disposed on each of the longitudinal channel edges of the packing unit, the respective legs of which U, gripping the peripheral portions of the support element, extend toward the plane of symmetry. The sides facing one another of the legs of the U form the bracing means, which cooperated with band faces, usable as supports, of the support element that face away from one another. The U-shaped, rectilinearly straightened-out extensions of the packing unit force the wiper blade to undergo the straightening out when the wiper blade is introduced in the longitudinal direction into the packing unit.

Another application—for instance when the support element does not protrude laterally past the wiper strip—provides that the wiper strip of the wiper blade is provided on each of its two opposed long sides with a respective longitudinal groove, open toward its respective long side, on the side faces of which the supports toward the wiper blade are embodied, and that furthermore, on each of the longitudinal channel edges, a respective clawlike extension is embodied, which extends toward the plane of symmetry into the particular longitudinal groove associated with it. The two clawlike extensions of the packing unit form its bracing means, which cooperate with groove walls, facing one another of the wiper strip that form the bracing means when the packing unit is slipped onto the wiper strip of the wiper blade and in the process is straightened out.

An especially simple, economical version of the invention is obtained if the wiper strip has a head strip, which is joined to the support element and via a rib remaining between the two longitudinal grooves is joined to the striplike wiper lip, and the supports of the wiper blade are embodied on the side walls of the two longitudinal grooves. Embodying the rib by the provision of the two longitudinal grooves is the current practice, and so these can be used for the packing unit.

Regardless of this, it can be expedient, for instance for the sake of stability, if the supports toward the wiper blade are embodied on longitudinal grooves disposed in the head strip.

A refinement of the invention provides that the packing unit has two joined-together channel-like components, whose respective supports point in opposite direction relative to a plane laid through the packing unit. As a result, it is attained that the forces exerted on the packing unit by the two straightened-out wiper blades located in the packing unit cancel one another out, because they are oriented contrary to one another. The dimensions of the walls of the packing unit can therefore be reduced.

Depending on the demands made of the thus-formed double packing unit in terms of its dimensions, it is an attractive option either to join the two components together along their channel bases, or to embody the packing unit such that its two components, over at least a portion thereof, have a common channel cheek.

Simple manufacture of the packing unit—for instance by endless extrusion—and simple manipulation on inserting the wiper blades into the packing unit are obtained if the channel-like component is open on both of its ends.

If the wiper blade, on the band face of the support element remote from the wiper lip, is provided, with a spoiler strip extending in the longitudinal direction of the wiper blade, protection for this spoiler strip is gained if the packing unit, on its side remote from the channel base, has a hood fitting over the spoiler strip.

Economical production of the packing unit is obtained if the packing unit is made from a plastic.

BRIEF DESCRIPTION OF THE DRAWINGS

Shown in the drawing are:

FIG. 6, a fragmentary longitudinal section taken along the line VI—VI through a first embodiment of the packing unit of FIG. 7, in which a wiper blade is accommodated;

FIG. 7, the cross-sectional area through the wiper blade and the packing unit of FIG. 6;

FIG. 8, a fragmentary longitudinal section taken along the line VIII—VIII through another embodiment of the packing unit of FIG. 9, in which a wiper blade is accommodated;

FIG. 9, the cross-sectional area through the wiper blade and the packing unit of FIG. 8;

FIG. 10, a fragmentary longitudinal section taken along the line X—X through another embodiment of the packing unit of FIG. 11, in which a wiper blade is accommodated;

FIG. 11, the cross-sectional area through the wiper blade and the packing unit of FIG. 10;

FIG. 12, the cross-sectional area as in FIG. 9 through a first embodiment of a packing unit that holds two wiper blades, the two wiper blade each being provided with a spoiler strip;

FIG. 13, the cross-sectional area as in FIG. 12 through a different embodiment of a packing unit that holds two wiper blades, each equipped with a spoiler strip;

FIG. 14, a side view, not to scale, of the packing unit of FIG. 12 and the two wiper blades to be accommodated in it; and FIG. 15, a side view of the packing unit of FIG. 14, in which the two wiper blades are accommodated in the packing unit.

DESCRIPTION OF THE PREFERRED EMBODIMENTS

Figure 1:
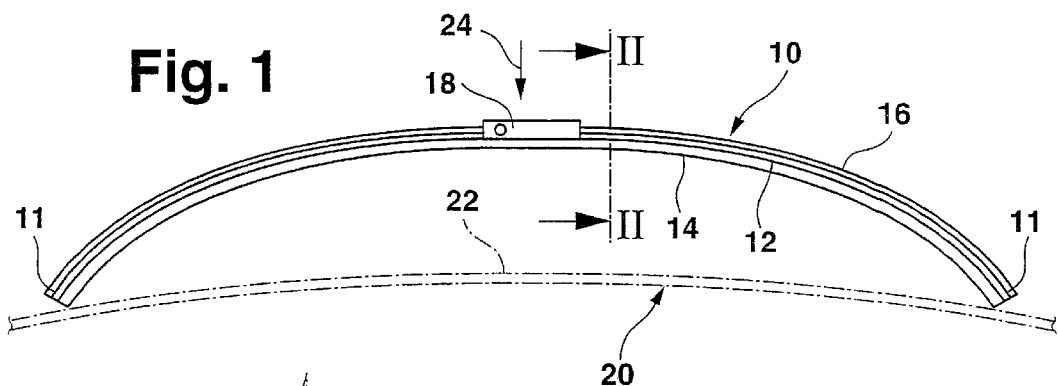
FIG. 1, a side view of a wiper blade to be packaged.

The wiper blade 10 shown in side view in FIG. 1 has an elongated, rubber-elastic wiper strip 12, which can be pressed with a wiper lip 14 against the surface 22 to be wiped of a motor vehicle window 20. The wiper strip 12 is retained parallel to the longitudinal axis by an elongated, spring-elastic support element 16 and together with it forms the wiper blade 10. The wiper blade 10 also includes a connection device 18, by way of which the wiper blade can be connected to a driven wiper arm, not shown. In dot-dashed lines, FIG. 1 also shows the cross section through the motor vehicle window 20 whose surface 22 to be wiped faces toward the striplike wiper lip 14. The wiper blade 10 is shown in a position in which it rests, completely unstressed, with only its two ends 11 against the surface 22 of the window 20. It can be seen that the wiper blade 10 has a greater curvature than the window 20 itself. This curvature of the wiper blade is due to a corresponding curvature of the support element 16, which is curved via its band faces 17. With respect to the thus-accomplished curvature of the wiper lip 14, the support element is disposed on the outside. When during wiper operation the wiper blade 10 is pressed by the wiper arm in the direction of an arrow 24 with its wiper lip 14 over its entire length against the window, the support element 16 now tensed against the window 20, 22 assures for proper distribution of the contact pressure (arrow 24).

Figure 2:
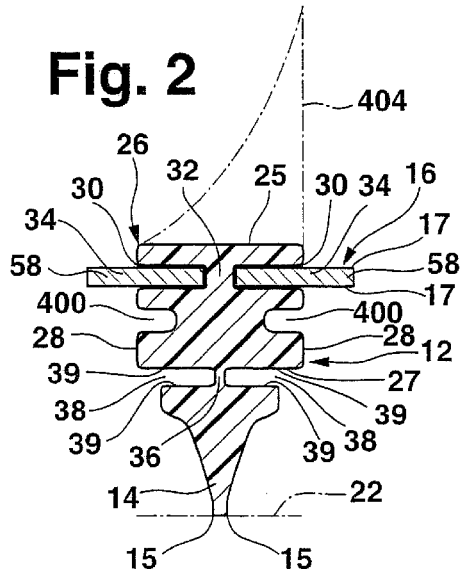
FIG. 2, the cross-sectional area of a section taken along the line II—II through a first embodiment of the wiper blade of FIG. 1.
Figure 3:
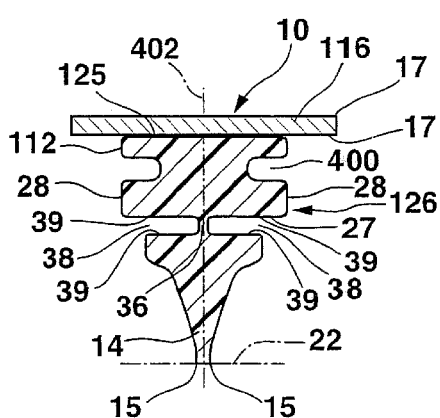
FIG. 3, the cross-sectional area of FIG. 2 through a different embodiment of the wiper blade.
Figure 4:
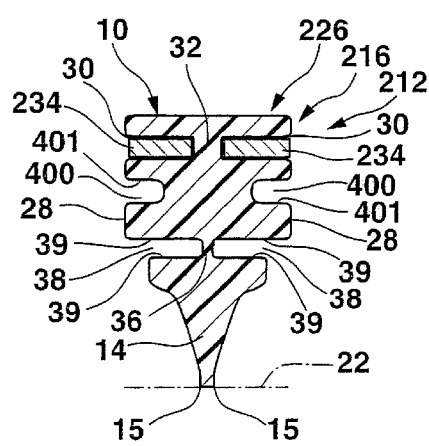
FIG. 4, the cross-sectional area of FIG. 2 through still another embodiment of the wiper blade.

FIGS. 2–4 show cross sections through various embodiments of the wiper blade of FIG. 1 in enlarged views. In a first embodiment in FIG. 2, the wiper strip 12 has a head strip 26, which is provided with two opposed longitudinal grooves 30, open toward its side faces 28, with a wall 32 remaining between the two grooves 30. The longitudinal grooves 30 each serve to receive one elongated, elastic spring rail 34, and both of these rails belong to the support element 16. The head strip 26 is adjoined by the elongated wiper lip 14, which is joined to the underside 27 of the head strip.26 via a so-called tilting rib 36.

The embodiment of the wiper blade 10 of FIG. 3 differs from the wiper blade described in conjunction with FIG. 2 in that a one-piece, bandlike-elongated, spring-elastic support element 116 is mounted on the top side 125 of the head strip 126, that is, the side remote from the wiper lip 14 of the wiper strip 112. The support element 116 corresponds entirely in both its curved shape and its intended tasks to the support element 16 of FIGS. 1 and 2. The connection between the wiper strip 112, or head strip 126, and the support element 116 can be made by an adhesive bond, for example.

The cross-sectional shape of the wiper blade 10 shown in FIG. 4 is entirely equivalent to the cross-sectional shape of FIG. 2, with the exception of the width of the two spring rails 234 that form the support element 216. In this case, the spring rails are adapted in their width to the depth of their receiving longitudinal grooves 30 in the head strip 226. However, it is also conceivable for the width of the support element 16 (FIG. 2) to taper from a wide middle section—where the connection device 18 is disposed—toward both ends 11 of the wiper blade 10, so that in the middle region of the wiper blade, a cross section as in FIG. 2 results, while the two end portions 11 of the wiper blade have a cross section as in FIG. 4.

Figure 5:
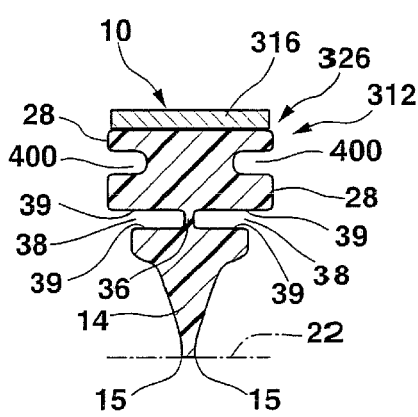
FIG. 5, the cross-sectional area of FIG. 2 through another embodiment of the wiper blade.

The cross section of the wiper blade 10 shown in FIG. 5 is equivalent to the cross section of the wiper blade shown in FIG. 3, with the exception of the width of the support element 316. Here the width of the support element is equivalent to the width of the head strip 326. The connection between the wiper strip 312 and the support element 316 can, as in the embodiment of FIG. 3, also be achieved by means of an adhesive bond. For both embodiments, of FIGS. 3 and 5, it is also true that tapering of the support element 116 from a middle section of the wiper blade with a width as in FIG. 3 to the two ends 11 of the wiper blade is tapered such that there the cross section of the wiper blade and support element 316 corresponds to that of the respective cross-sectional shape in FIG. 5.

In all four embodiments of the wiper blade described (FIGS. 2–5), it is furthermore possible for opposed longitudinal grooves 400, open toward the side faces 28 of the head strips, to be disposed in the respective head strip 26, 126, 226 and 326, which grooves can for instance contribute to better adaptation of the wiper blade to the shape of the window surface.

The construction of the wiper blades 12, 112, 212 and 312, of FIGS. 2–5, respectively is typically done such that a longitudinal plane of symmetry 402 is brought about, whose course is however—for the sake of simplicity—shown only in FIGS. 3 and 7. The plane of symmetry 402 extends through the head strip 126, the tilting rib 36 and the wiper lip 14 and is disposed perpendicular to the window surface 22.

Another possible design of the wiper blade is shown in FIG. 2. It can be seen there that at the top side 25 of the head strip 26 remote from the wiper lip 14, the head strip changes over into a so-called spoiler strip, which has been assigned reference numeral 404 in FIG. 2. This spoiler strip 404, shown in dot-dashed lines, typically extends over the entire length of the wiper blade or wiper strip.

If for the reasons noted at the outset the wiper blades of FIGS. 2–5 are to reach the end user undamaged, their especially vulnerable regions on the wiper edges 15 embodied on the wiper lip 14 can be protected by packing units whose particular designs will now be described in further detail in conjunction with FIGS. 6–11. It is common to all these packing units that they are embodied as a straightened-out, channel-like cross section component that is rigid in the longitudinal direction, with these components open on both ends; that is, they have no terminal wall. This makes it possible to produce the components by economical endless extrusion.

A first embodiment of a packing unit 50 of the invention will be described in conjunction with FIGS. 6 and 7 and a wiper blade having a cross section as in FIG. 2. From FIG. 7 in conjunction with FIG. 2, it can be seen that on at least two lateral peripheral portions 58 facing one another relative to the plane of symmetry 402, the support element 16 of the wiper blade 10 protrudes past the wiper strip 12. The component 51 of the packing unit 50 of FIG. 7 is provided with U-shaped cross section extensions 54 on its longitudinal channel edge 52. The legs 56 of the U of the extensions each extend toward the plane of symmetry 402 and grip the peripheral portions 58 of the support element 16. The component 51 itself, with its two channel cheeks 60 and the channel base 62, surrounds the wiper lip 14 of the wiper blade 10 over its entire length with spacing from it, when the wiper blade 10 is accommodated, from an open end of the channel-like component 51, in the packing unit 50. The desired straightening out of the wiper blade is visible from the enlarged fragmentary longitudinal section (FIG. 6). It can be seen that each peripheral portion 58 of the support element 16, viewed in the longitudinal direction, has three contact points 64 on the legs 56 of the U-shaped extensions 54, thus created an essentially straightened-out, reliably fixed position of the wiper blade or wiper strip in the packing unit 50. The peripheral portions 58 of the support element 16 thus form supports of the wiper blade 10 that cooperate with the supports, forming contact points 64, of the packing unit that are formed by the sides facing one another of the two legs 56 of the U on each of the two longitudinal channel edges 52. Since the spacing 66 between the two insides, facing one another, of the legs 56 of the U that belong to one another must for self-evident reasons be somewhat larger than the thickness of the support element, it is permissible for the packaged wiper blade still to be slightly curved. This residual curvature is of no significance, however, to the desired straightening out of the wiper blade.

Another design of the packing unit 68 of the invention will be described in detail below in conjunction with FIGS. 8 and 9 and a wiper blade that has a cross section as in FIG. 4. In this embodiment as well, the packing unit 68 has an elongated channel-like cross section component 70, which is provided on each of its two longitudinal channel edges 71 with a respective clawlike extension 72. The two clawlike extensions 72 extend from the longitudinal channel edges 71 toward one another or toward the plane of symmetry 402. In the process, these clawlike extensions 72 dip into the grooves 400, which as in FIGS. 2–5 are disposed in the respective head strip 26, 126, 226, and 236 of the wiper blade 10. If the wiper blade, as in FIG. 9, is located in the packing unit 68, then with the side walls 401, facing one another, of the two grooves 400, the wiper blade or wiper strip is braced on the side faces 63, assigned to these grooves, of the clawlike extensions 72 of the packing unit 68, thus creating a stable three-point contact, whose contact points are identified by reference numeral 74 in FIG. 8. Thus the advantageous, desired straightening out of the wiper blade is automatically obtained during the insertion of the wiper blade into the packing unit 68.

In a modification of the exemplary embodiment of FIGS. 8 and 9, a further embodiment of the packing unit 76 with clawlike extensions 80 disposed on the longitudinal channel edges 71 of the channel-like cross section component 76 can engage the longitudinal grooves 38 of the wiper strip 12, which lead to the formation of the tilting rib 36 (FIGS. 4 and 11). Once the packing unit 76 has now been mounted on the wiper strip 12, as in FIG. 1, the resultant situation is as shown in the longitudinal section of FIG. 10. With the side walls 39 of the longitudinal grooves 38 at three contact points 82, the wiper blade is braced on the faces 81, pointing away from one another, of the clawlike extensions 80, thus straightening out the wiper blade as desired.

In all the embodiments, the protection of the wiper edges of the wiper lip 14 is assured by the channel base region of the respective packing units 50, 68 and 76, which surround the wiper lip 14 in spaced-apart fashion. The straightening out of the wiper blade is achieved in all the embodiments by means of a suitably stable, rigid embodiment of the respective packing unit, which is preferably made from a plastic.

From FIG. 12, it can be seen that a preferred embodiment of the packing unit of the invention can be in the form of a so-called double unit 86. Here, in a first version, two single units 68 are joined together along their channel bases 62. In a variant shown in FIG. 13, the two single units 68 that belong to one double packing unit 186 have a common channel cheek 60. In both versions of a double unit, in FIGS. 12 and 13, the bracing means point in opposite directions relative to a longitudinal plane 88 laid through the packing unit. The resultant advantage can be seen from FIGS. 14 and 15. In FIG. 14, it can be seen that the double packing unit 86 is straightened out, while the two wiper blades 10 to be accommodated in it have the curvature already explained in conjunction with FIG. 1. It is clear that after the two wiper blades 10 have been introduced into the double packing unit 86—that is, once the two wiper blades 10 are straightened out—they exert a stress on the packing unit 86 as a consequence of the tension that these wiper blades now generate, and this stress must be absorbed in individual packing units by suitable dimensioning. However, since—as seen from FIG. 15—the forces (arrows 99) exerted by the two wiper blades 10 are oriented contrary to one another, this stress is cancelled out. It can also been seen from FIG. 13 that each of the packing units of the invention can be provided, on their side remote from the channel base 62, with a suitable hood 92, which fits protectively over a spoiler strip 404 (FIG. 2) disposed on the wiper blade and extending in the longitudinal direction of the wiper blade.

Independently of the term "packing unit" used here, it is understood that the invention encompasses modifications of the elements of the invention as well.

For example, it is conceivable for these elements to be used solely as aids in straightening out the wiper blade, and for this combination then to be accommodated in an additional container.

It is common to all the versions of the packing unit of the invention that the wiper blade, viewed in the longitudinal direction, is provided on both sides of a plane of symmetry that intersects the band faces of the support element, with supports oriented transversely to this plan; that the packing unit is embodied as a straightened-out component, adapted to the length of the wiper strip and channel-like cross section and rigid in the longitudinal direction, which with its channel base crosses over the plane of symmetry of the wiper strip in spaced-apart fashion from the wiper lip and is provided, in the region of the longitudinal channel edges, with bracing means associated with the supports of the wiper blade, which bracing means force the wiper blade, counter to the spring force of the support element, into an at least substantially straightened-out position.

What is claimed is:

1. A combination of a packing unit with a motor vehicle window wiper blade, comprising a wiper blade which has an elongated, rubber-elastic wiper strip, a wiper lip pressable against a window, and a band shaped, elongated spring-elastic support element which retains the wiper strip in unstressed condition and has supports at both sides of a transverse plane of symmetry of the wiper blade, and a packing unit comprising a straightened-out component extending along a length of the wiper strip and being rigid in a longitudinal direction, said straighten-out component having a channel-shaped cross-section with a channel base formed to surround and to extend over an entire length of the wiper strip, and also having longitudinal channel edges associatable with said supports and forcing the wiper blade counter to a spring force of the support element into at least substantially straightened-out position.

2. A combination as defined in claim 1, wherein said supports have lateral peripheral portions extending laterally beyond the wiper strip, said longitudinal channel edges being provided with U-shaped extensions which grip said lateral peripheral portions of said supports.

3. A combination as defined in 1, wherein said straightened out component is composed of plastic.

4. A combination of a packing unit with a motor vehicle window wiper blade, comprising a wiper blade which has an elongated, rubber-elastic wiper strip, a wiper lip pressable against a window, and a band shaped, elongated spring-elastic support element which retains the wiper strip in unstressed condition and has supports at both sides of a transverse plane of symmetry of the wiper blade, and a packing unit comprising a straightened-out component extending along a length of the wiper strip and being rigid in a longitudinal direction, said straighten-out component having a channel-shaped cross-section with a channel base formed to surround and to extend over an entire length of the wiper strip, and also having longitudinal channel edges associatable with said supports and forcing the wiper blade counter to a spring force of the support element into at least substantially straightened-out position, said supports are embedded in two opposite longitudinal grooves provided on longitudinal sides of the wiper strip, said longitudinal channel edges having claw-shaped extensions engageable in further longitudinal grooves of the wiper strip.

5. A combination as defined in claim 4, wherein said supports are arranged on side walls of the longitudinal grooves located at both sides of a rib which connects a head strip to a support element of the wiper strip.

6. A combination as defined in claim 5, wherein said supports are formed so that they are arranged on the longitudinal grooves disposed in a head strip of the wiper strip.

7. A combination of a packing unit with a motor vehicle window wiper blade, comprising a wiper blade which has an elongated, rubber-elastic wiper strip, a wiper lip pressable against a window, and a band shaped, elongated spring-elastic support element which retains the wiper strip in unstressed condition and has supports at both sides of a transverse plane of symmetry of the wiper blade, and a packing unit comprising a straightened-out component extending along a length of the wiper strip and being rigid in a longitudinal direction, said straighten-out component having a channel-shaped cross-section with a channel base formed to surround and to extend over an entire length of the wiper strip, and also having longitudinal channel edges associatable with said supports and forcing the wiper blade counter to a spring force of the support element into at least substantially straightened-out position; a second such straightened-out component connected with said first mentioned straightened-out component; and further supports, said first mentioned supports and said further supports pointing in opposite directions relative to a plane extending through the packing unit.

8. A combination as defined in claim 5, wherein said two straighten-out components are joined together along channel bases of said straighten-out components.

9. A combination 8, wherein said two straightened-out components have a common channel cheek over at least a portion of said components.

10. A combination of a packing unit with a motor vehicle window wiper blade, comprising a wiper blade which has an elongated, rubber-elastic wiper strip, a wiper lip pressable against a window, and a band shaped, elongated spring-elastic support element which retains the wiper strip in unstressed condition and has supports at both sides of a transverse plane of symmetry of the wiper blade, and a packing unit comprising a straightened-out component extending along a length of the wiper strip and being rigid in a longitudinal direction, said straighten-out component having a channel-shaped cross-section with a channel base formed to surround and to extend over an entire length of the wiper strip, and also having longitudinal channel edges associatable with said supports and forcing the wiper blade counter to a spring force of the support element into at least substantially straightened-out position, said straighten-out component being open on its both ends.

11. A combination of a packing unit with a motor vehicle window wiper blade, comprising a wiper blade which has an elongated, rubber-elastic wiper strip, a wiper lip pressable against a window, and a band shaped, elongated spring-elastic support element which retains the wiper strip in unstressed condition and has supports at both sides of a transverse plane of symmetry of the wiper blade, and a packing unit comprising a straightened-out component extending along a length of the wiper strip and being rigid in a longitudinal direction, said straighten-out component having a channel-shaped cross-section with a channel base formed to surround and to extend over an entire length of the wiper strip, and also having longitudinal channel edges associatable with said supports and forcing the wiper blade counter to a spring force of the support element into at least substantially straightened-out position, said straighten-out component having a hood formed to fit over a spoiler strip provided in the wiper blade.

* * * * *